（12) United States Patent
Cai et al.

(10) Patent No.: US 10,904,862 B2
(45) Date of Patent: Jan. 26, 2021

(54) WIRELESS ACCESS POINT ASSISTANCE TO WIRELESS USER DEVICES FOR WIRELESS COMMUNICATION NETWORK SELECTION

(71) Applicant: Sprint Communications Company L.P., Overland Park, KS (US)

(72) Inventors: Zheng Cai, Fairfax, VA (US); Zheng Fang, McLean, VA (US); Yu Wang, Fairfax, VA (US)

(73) Assignee: Sprint Communications Company L.P., Overland Park, KS (US)

( * ) Notice: Subject to any disclaimer, the term of this patent is extended or adjusted under 35 U.S.C. 154(b) by 0 days.

(21) Appl. No.: 16/414,466

(22) Filed: May 16, 2019

(65) Prior Publication Data

US 2020/0367201 A1    Nov. 19, 2020

(51) Int. Cl.
*H04W 72/00* (2009.01)
*H04W 48/18* (2009.01)
(Continued)

(52) U.S. Cl.
CPC ......... *H04W 72/005* (2013.01); *H04W 48/10* (2013.01); *H04W 48/16* (2013.01); *H04W 48/18* (2013.01); *H04W 84/042* (2013.01)

(58) Field of Classification Search
None
See application file for complete search history.

(56) References Cited

U.S. PATENT DOCUMENTS 8,538,444 B2  9/2013  Lee et al.
8,649,291 B2  2/2014  Wang et al.
(Continued)

FOREIGN PATENT DOCUMENTS

EP    2782387 A1    9/2014
EP    2560423 B1    7/2017

OTHER PUBLICATIONS

"3rd Generation Partnership Project; Technical Specification Group Services and System Aspects; System rchitecture for the 5G System; Stage 2 (Release 16)"; Apr. 2019; pp. 1-317; 3GPP TS 23.501 V16.0.2; 3GPP rganizational Partners; Sophia Antipolis Valbonne, France.

*Primary Examiner* — Diane L Lo (57) ABSTRACT

A wireless access point assists wireless user devices when the user devices select wireless communication networks. In the wireless access point, a baseband unit generates a broadcast block that comprises a cell identifier for the wireless access point, wireless communication network identifiers, and network selection information that individually characterizes the wireless communication networks. The network selection information may comprise individualized access parameters for different Land Mobile Networks (PLMNs). In the wireless access point, a radio transceiver wirelessly broadcasts the broadcast block to the wireless user devices. The wireless user devices receive the broadcast block and select their wireless communication networks based on the network selection information in the broadcast block. The radio transceiver wirelessly receives user signaling from the wireless user devices that indicates their selected wireless communication networks. The baseband unit transfers network signaling that indicates the selected wireless communication networks for the wireless user devices.

20 Claims, 7 Drawing Sheets

(51) Int. Cl.
   *H04W 48/10*   (2009.01)
   *H04W 48/16*   (2009.01)
   *H04W 84/04*   (2009.01)

(56) References Cited

U.S. PATENT DOCUMENTS

| | | |
|---|---|---|
| 8,825,047 B2 | 9/2014 | Saini et al. |
| 8,897,224 B2 | 11/2014 | Ben-Eli |
| 9,241,302 B2 | 1/2016 | Ramachandran et al. |
| 2008/0102896 A1* | 5/2008 | Wang ............... H04W 60/04 |
| | | 455/560 |
| 2008/0200146 A1 | 8/2008 | Wang et al. |
| 2016/0353361 A1 | 12/2016 | Jung et al. |
| 2017/0374608 A1* | 12/2017 | Li ..................... H04W 60/00 |
| 2018/0324679 A1* | 11/2018 | Basu Mallick ....... H04W 48/12 |
| 2018/0324742 A1* | 11/2018 | Agarwal ............. H04L 27/2607 |
| 2019/0069205 A1* | 2/2019 | Lee ................... H04W 36/14 |
| 2019/0069325 A1 | 2/2019 | Yerramalli et al. |
| 2020/0107233 A1* | 4/2020 | Agiwal ............... H04W 72/042 |

\* cited by examiner

WIRELESS ACCESS POINT ASSISTANCE TO WIRELESS USER DEVICES FOR WIRELESS COMMUNICATION NETWORK SELECTION

TECHNICAL BACKGROUND

A wireless user device exchanges wireless signals with a wireless access point for data services like voice-calling, internet-access, and machine control. The wireless access point exchanges user data and network signaling with a network core to deliver these data services to the wireless user device. The wireless access point may support multiple wireless communication networks that share the wireless access point. For example, a popular form of wireless networking is Fifth Generation New Radio (NR), and a single 5GNR access point may support multiple Public Land Mobile Networks (PLMNs). The wireless user device selects a particular wireless communication network and requests access to that wireless communication network from the wireless access point.

To assist the wireless user device with wireless network selection, the wireless access point broadcasts network selection information to the wireless user device (and other devices). For example, a 5GNR access point broadcasts a Master Information Block (MIB) and several System Information Blocks (SIBs) to the 5GNR user devices it serves. The wireless user device receives the broadcast and processes the network selection information to select their wireless communication network. For example, a 5GNR user device may process Cell Select Info from a SIB to select a PLMN.

In 5GNR, SIB1 indicates a Physical Cell Identifier (PCI) for the 5GNR access point that is broadcasting the SIB1. The SIB1 lists PLMNs that are available from the PCI. For the specific PCI, the SIB1 also lists Cell Select Info, Cell Access Related Info, User Access Class Barring Info, and Neighbor Cell Configuration Information. Thus, all of the PLMNs share the same PCI, Cell Select Info, Cell Access Related Info, User Access Class Barring Info, and Neighbor Cell Configuration Information. The 5GNR user device cannot properly compare the PLMNs.

Unfortunately, the wireless access points do not efficiently and effectively assist wireless user devices when selecting wireless communication networks like PLMNs.

TECHNICAL OVERVIEW

A wireless access point assists wireless user devices when the user devices select wireless communication networks. In the wireless access point, a baseband unit generates a broadcast block that comprises a cell identifier for the wireless access point, wireless communication network identifiers, and network selection information that individually characterizes the wireless communication networks. In the wireless access point, a radio transceiver wirelessly broadcasts the broadcast block to the wireless user devices. The wireless user devices receive the broadcast block and select their wireless communication networks based on the network selection information in the broadcast block. The radio transceiver wirelessly receives user signaling from the wireless user devices that indicates their selected wireless communication networks. The baseband unit transfers network signaling that indicates the selected wireless communication networks for the wireless user devices.

DETAILED DESCRIPTION

Figure 1:
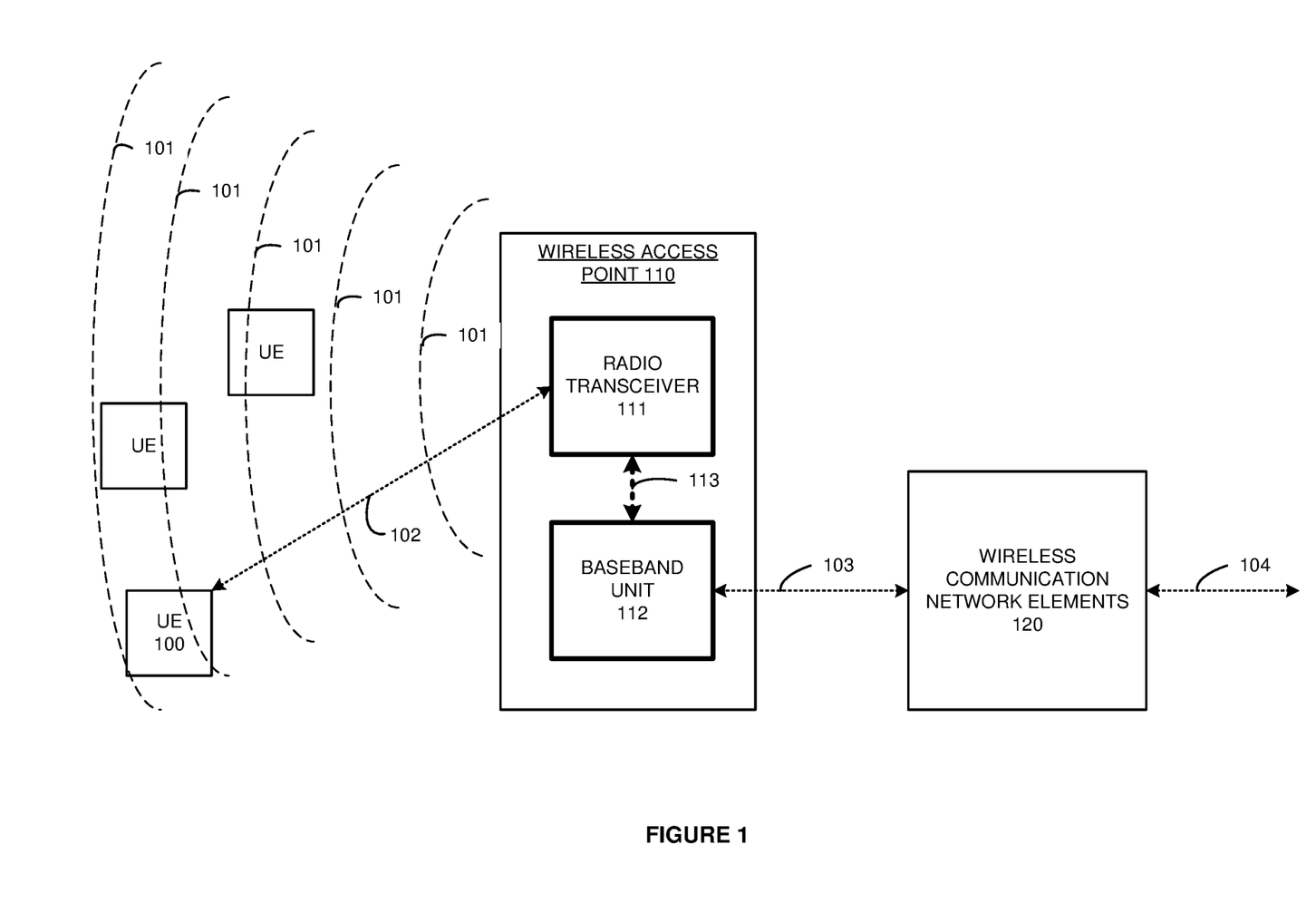
FIG. 1 illustrates a wireless access point that assists wireless User Equipment (UE) with the selection of wireless communication networks.

FIG. 1 illustrates wireless access point 110 that assists wireless User Equipment (UE) 100 with the selection of wireless communication networks. The wireless communication networks include Public Land Mobile Networks (PLMNs), Virtual Private Networks (VPNs), wireless network slices, and/or the like. The wireless communication networks comprise portions of wireless access point 110, network elements 120, and links 102-104. Wireless access point 110 comprises radio transceiver 111, baseband unit 112, and network link 113.

Radio transceiver 111 in wireless access point 110 broadcasts wireless signal 101 that is received by UEs in the area including UE 100. UE 100 and radio transceiver 111 also communicate over wireless link 102. Radio transceiver 111 and baseband unit 112 communicate over network link 113. Baseband unit 112 and network elements 120 communicate over network links 103. Network elements 120 and other systems like the internet and enterprise networks communicate over network links 104.

UE 100 might be a phone, computer, robot, vehicle, sensor, and/or the like. UE 100 comprises radio circuitry and user circuitry. The radio circuitry comprises antennas, modulators, amplifiers, filters, digital/analog interfaces, microprocessors, and memory. The user circuitry comprises microprocessors, memory, and user interfaces. The memory stores an operating system, network applications, and user applications. In some examples, the network applications comprise Fifth Generation New Radio (5GNR) Physical Layer (PHY), Media Access Control (MAC), Radio Link Control (RLC), Packet Data Convergence Protocol (PDCP), Radio Resource Control (RRC), and Service Data Application Protocol (SDAP). The microprocessors execute the operating system, network applications, and user applications to receive wireless signal 101 from radio transceiver 111 and to exchange user data with radio transceiver 111 over wireless link 102.

In wireless access point 110, radio transceiver 111 comprises antennas, modulators, amplifiers, filters, digital/analog interfaces, microprocessors, memory, transceivers, and bus structures. Baseband unit 112 comprises microprocessors, memory, transceivers, and bus structures. The microprocessors may comprise Digital Signal Processors (DSPs), Central Processing Units (CPUs), Graphical Processing Units (GPUs), Field Programmable Gate Arrays (FPGAs), Application-Specific Integrated Circuits (ASICs), and/or the like. The memories comprise Random Access Memory (RAM), flash circuitry, disk drives, and/or the like. The memories store operating systems, network applications, and possibly virtual layer components. If present, the virtual layer components comprise hypervisor modules, virtual switches, virtual machines, and/or the like. In some examples, the network applications comprise 5GNR PHY, MAC, RLC, PDCP, RRC, and SDAP. The microprocessors execute the operating systems, virtual layer components (if any), and network applications to: 1) broadcast wireless signal 101, 2) exchange user data with UE 100 over wireless link 102, 3) exchange the user data for UE 100 over network link 113, and 4) exchange the user data for UE 100 with wireless communication network elements 120 over network links 103.

Network elements 120 comprise computer circuitry and software. Exemplary network elements comprise Fifth Generation Core (5GC) Access and Mobility Management Function (AMF), Session Management Function (SMF), User Plane Function (UPF), Policy Control Function (PCF), Authentication and Security Function (AUSF), and the like. The network elements exchange the user data with baseband unit 112 in wireless access point 110 over network links 103. The network elements exchange user data with external systems over network links 104.

In wireless access point 110, baseband unit 112 receives network information over network links 103 from a provisioning system in network elements 120. The network information indicates wireless communication networks and individual network selection information for each of the wireless communication networks. The wireless communication networks might PLMNs, VPNs, network slices, and/or the like. The network selection information may comprise Cell Selection Information, Cell Access Related Information, User Access Class Barring Information, Neighbor Cell Configuration Information, and/or the like.

Baseband unit 112 generates a broadcast block for wireless signal 101. The broadcast block contains a wireless network cell identifier for wireless access point 110 like a Physical Cell Identifier (PCI), Base Station Identifier (BSID), and/or the like. The broadcast block contains the wireless communication network identifiers like PLMNs ID, VPN IDs, and/or network slice IDs. The broadcast block contains the individual network selection information for each of the wireless communication network identifiers. For example, the broadcast block may indicate multiple PLMNs and indicate individual Cell Selection Information for each of the PLMNs.

In wireless access point 110, radio transceiver 111 wirelessly broadcasts the broadcast block over wireless signal 101. In some examples, the broadcast block comprises a 5GNR System Information Block (SIB) 1. UE 100 (and other UEs) receive the broadcast block over wireless signal 101. UE 100 selects one of the wireless communication networks that was specified in the broadcast block based on the network selection information that was included in the broadcast block. UE 100 then uses the selected wireless communication network to establish wireless link 102 with wireless access point 110.

In particular, radio transceiver 111 wirelessly receives network signaling from UE 100 over wireless link 102 that indicates its selected wireless communication network. Radio transceiver 111 transfers network signaling that indicates the selected wireless communication network for UE 100 to baseband unit 112 over network link 113. Baseband unit 112 transfers network signaling indicating the selected wireless communication network for UE 100 to network elements 120 like an AMF and/or SMF over network links 120. UE 100 then uses the selected wireless communication network to exchange user data over wireless access point 110 and network elements 120.

Advantageously, wireless access point 110 efficiently and effectively assists 5GNR UE 100 when selecting wireless communication networks like PLMNs.

Figure 2:
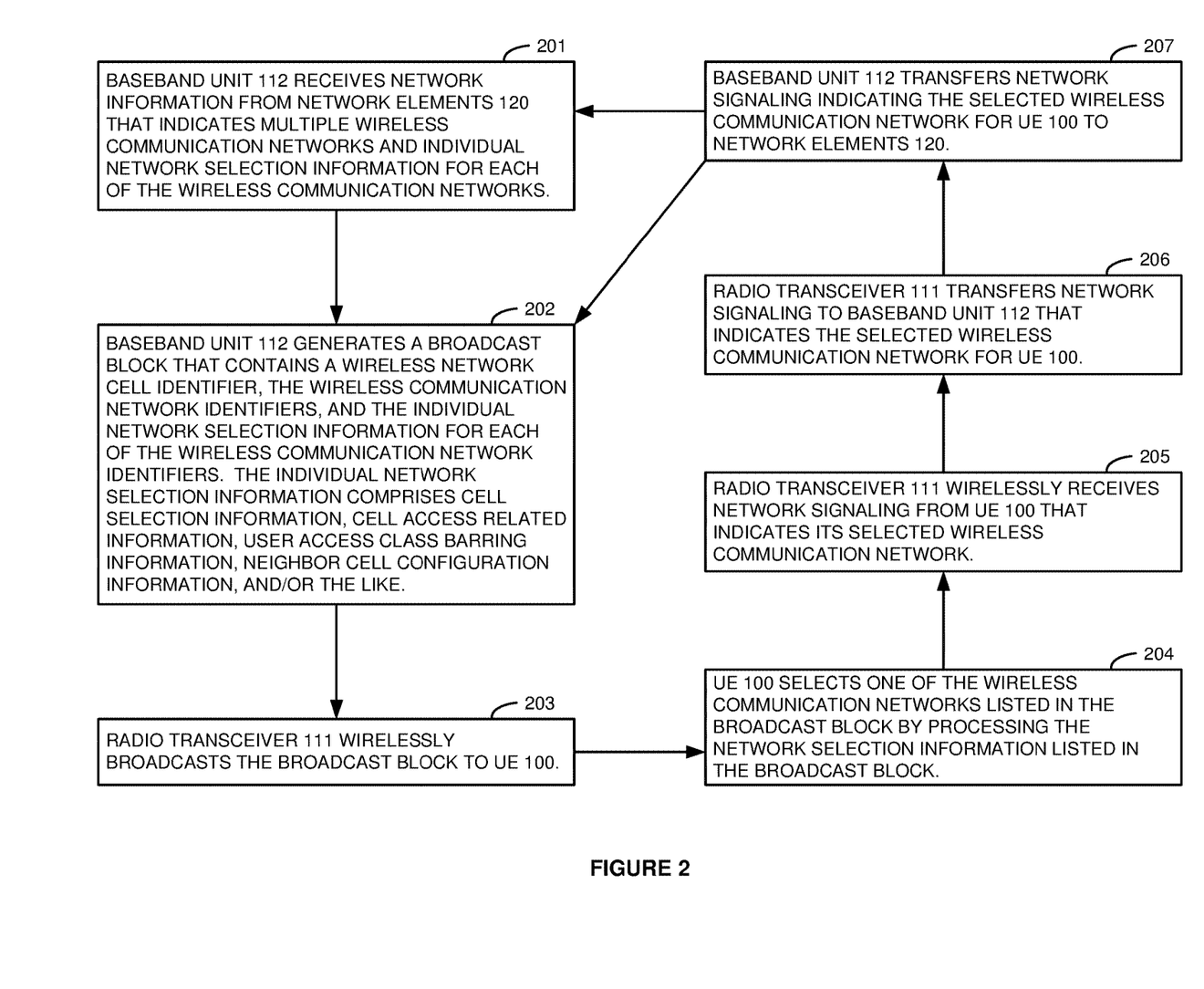
FIG. 2 illustrates the operation of the wireless access point to assist the wireless UE with the selection of the wireless communication networks.

FIG. 2 illustrates the operation of wireless access point 110 to assist wireless UE 100 with the selection of wireless communication networks. Baseband unit 112 receives network information from a provisioning system in network elements 120 that indicates multiple wireless communication networks and individual network selection information for each of the wireless communication networks (201). In response, baseband unit 112 generates a broadcast block that contains a wireless network cell identifier, the wireless communication network identifiers, and the individual network selection information for each of the wireless communication network identifiers (202). The individual network selection information might comprise Cell Selection Information, Cell Access Related Information, User Access Class Barring Information, Neighbor Cell Configuration Information, and/or the like. For example, the broadcast block may indicate multiple VPNs and indicate individual User Access Class Barring Information for each of the VPNs.

Radio transceiver 111 wirelessly broadcasts the broadcast block to UE 100 (203). UE 100 selects one of the wireless communication networks listed in the broadcast block by processing the network selection information listed in the broadcast block (204). For example, UE 100 might select a wireless communication network that has Cell Selection Info values which exceed a corresponding set of thresholds. UE 100 might select a wireless communication network that has Neighbor Cell Configuration Information which matches a specific text string. Radio transceiver 111 wirelessly receives network signaling from UE 100 that indicates its selected wireless communication network (205). Radio transceiver 111 transfers network signaling to baseband unit 112 that indicates the selected wireless communication network for UE 100 (206). Baseband unit 112 transfers network signaling indicating the selected wireless communication network for UE 100 to network elements 120 (207). The operation then typically proceeds to back block 202, although the operation will sometimes branch back to block 201 when baseband unit 112 receives new network information that indicates new wireless communication networks and/or new network selection information.

Figure 3:
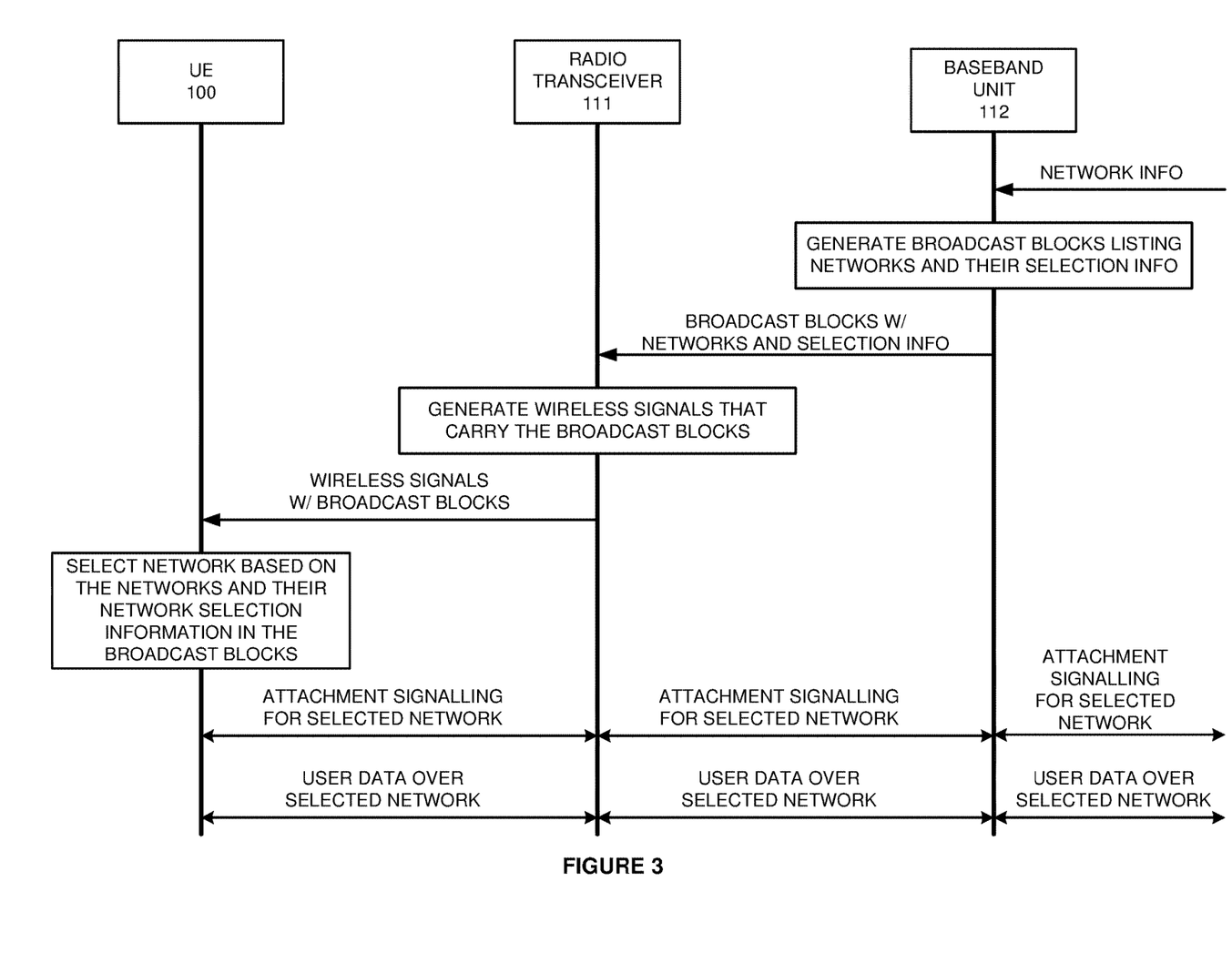
FIG. 3 illustrates the operation of the wireless access point to assist the wireless UE with the selection of the wireless communication networks.

FIG. 3 illustrates the operation of wireless access point 110 to assist wireless UE 100 with the selection of wireless communication networks. Baseband unit 112 receives network information from a provisioning system in network elements 120. The network information indicates multiple wireless communication networks and individual network selection information for each of the wireless communication networks. Baseband unit 112 generates broadcast blocks that each contain: 1) an identifier for wireless access point 110, 2) identifiers for the wireless communication networks that are available from wireless access point 110, and 3) individual network selection information that characterizes each of the wireless communication networks.

Radio transceiver 111 generates wireless signals to carry the broadcast blocks and wirelessly broadcasts the wireless signals that carry the broadcast blocks to UE 100. UE 100 receives the wireless signals that carry the broadcast blocks. In response, UE 100 selects one of the wireless communication networks based on the network selection information in the broadcast blocks. UE 100 then exchanges attachment signaling with radio transceiver 111 to wirelessly attach to the selected wireless communication network. Radio transceiver 111 exchanges the attachment signaling with baseband unit 112, and baseband unit 112 exchanges attachment signaling with an AMF in network elements 120 to attach UE 100 to its selected wireless communication network. UE 100 then exchanges user data with radio transceiver 111 over the selected wireless communication network. Radio transceiver 111 exchanges the user data with baseband unit 112 over the selected wireless communication network. Baseband unit 112 exchanges the user data with a UPF in network elements 120 over the selected wireless communication network.

Figure 4:
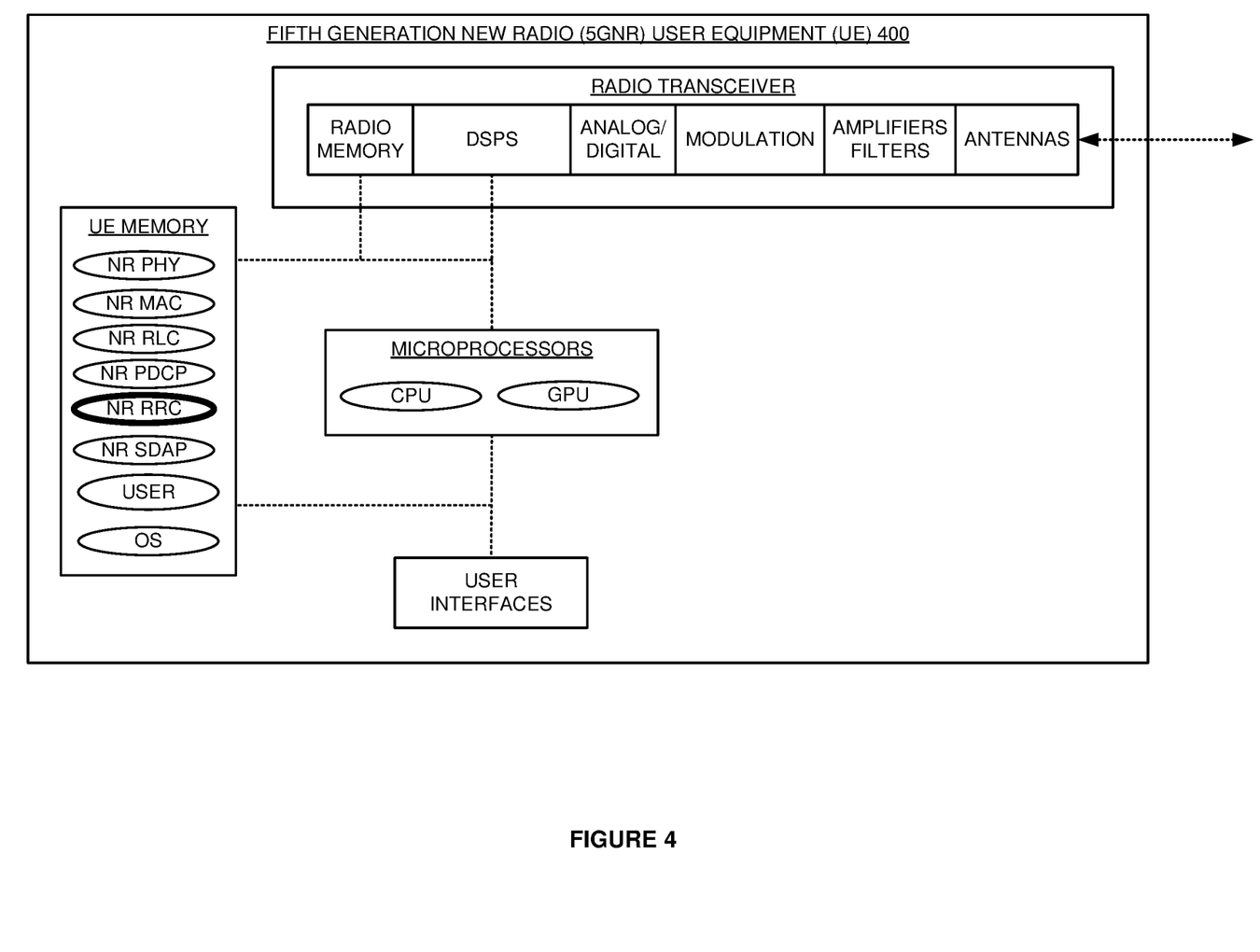
FIG. 4 illustrates a Fifth Generation New Radio (5GNR) UE that selects PLMNs based on a 5GNR System Information Block (SIB) 1 that indicates a Physical Cell Identifier (PCI), multiple Public Land Mobile Identifiers (PLMN IDs), and individual PLMN information for each of the PLMN IDs.

FIG. 4 illustrates Fifth Generation New Radio (5GNR) UE 400 that selects Public Land Mobile Networks (PLMNs) based on a 5GNR System Information Block (SIB) 1 that indicates a Physical Cell Identifier (PCI), PLMN IDs for the PLMNs, and individual network information characterizing each of the PLMNs. NR UE 400 is an example of UE 100 although UE 100 may differ. 5GNR UE 400 comprises microprocessors, UE memory, user interfaces, and a radio transceiver that are coupled together over bus circuitry and/or some other data links. The UE memory comprises volatile and non-volatile data storage like RAM, flash, and/or disc. The UE memory stores an operating system (OS), network applications, and user applications. The network applications comprise NR PHY, NR MAC, NR RLC, NR PDCP, NR RRC, and NR SDAP. The microprocessors comprises CPUs, GPUs, and/or some other computer circuitry. The radio transceiver comprises antennas, duplexers, amplifiers/filters, modulation, analog/digital interfaces, DSPs, and radio memory. The user interfaces may comprise transceivers, machine controllers, graphic displays, sensors, cameras, and/or some other user components.

The microprocessors execute the operating system and user applications to generate user data and user signaling. The microprocessors execute the operating system and the network applications to drive the radio transceiver to wirelessly exchange corresponding user data and network signaling with 5GNR access points. The received network signaling includes broadcast SIBs that characterize PLMNs. The transmitted network signaling indicates the PLMN selections of 5GNR UE 400. In the radio transceiver, the antennas exchange the user data and network signaling with the 5GNR access points over wireless NR links. The DSPs drive the exchange of the user data and the network signaling between the antennas and the radio memory. The network applications drive the exchange of the user data and the signaling between the radio memory and the UE memory.

The microprocessors execute the operating system and user applications to store Uplink (UL) user data and user signaling in the UE memory. The microprocessors execute the operating system and network applications to store corresponding UL user data and network signaling in the radio memory of the radio transceiver. In the radio transceiver, the DSPs process the user data and network signaling and transfer corresponding UL signals to the analog/digital interface. The analog/digital interface converts the digital UL signals into analog UL signals for modulation. Modulation up-converts the analog UL signals to their carrier frequencies. The amplifiers boost the modulated UL signals for the filters which attenuate unwanted out-of-band energy. The filters transfer the UL signals through the duplexers to the antennas. The electrical UL signals drive the antennas to emit corresponding wireless UL signals that transport the UL user data and network signaling to 5GNR access points.

In the radio transceiver, the antennas receive wireless Downlink (DL) signals that transport user data and network signaling from the NR access points. The DL network signaling includes broadcast SIBs that characterize the available PLMNs. The antennas transfer corresponding electrical DL signals through the duplexers to the amplifiers. The amplifiers boost the received DL signals for filters which attenuate unwanted energy. In modulation, demodulators down-convert the DL signals from their carrier frequencies. The analog/digital interfaces convert the analog DL signals into digital DL signals for the DSPs. The DSPs recover DL data from the digital DL signals. The DSPs transfer the DL data to the UE memory. The microprocessors execute the network applications to process the DL user data and network signaling to recover and transfer corresponding user data and signaling to the user applications through the operating system. Moreover, the network applications process the 5GNR SIB1 in the DL network signaling to select their PLMNs based on individual PLMN data in the SIB1.

Through the operating system, the user applications exchange user data with the NR SDAP and exchange user signaling with the NR RRC. The NR SDAP and RRC map between the user data/signaling and Service Data Units (SDUs) that carry corresponding user data and network signaling. The NR SDAP and RRC exchange their SDUs with the NR PDCP. The NR PDCP maps between the SDUs and Protocol Data Units (PDUs). The NR PDCP exchange the PDUs with the NR RLC. The NR RLC maps between the PDUs and MAC logical channels. The NR RLC exchanges the user data and network signaling with the NR MAC over the MAC logical channels. The NR MAC maps between the MAC logical channels and MAC transport channels. The NR MAC exchanges the user data and network signaling with the PHYs over the MAC transport channels. The NR PHY maps between the MAC transport channels and PHY transport channels. The NR PHY exchanges the user data and network signaling with the NR PHYs in the 5GNR access points over the PHY transport channels.

RRC functions comprise identifying PLMNs and their selection data from the SIBs and then using the selection data to select PLMNs. For example, the RRC might be configured to select PLMNs based on a prioritized list of PLMN data fields and text that the RRC matches against the SIB1 PLMN characterizations. RRC functions also comprise authentication, security, handover control, status reporting, Quality-of-Service (QoS), and network pages. SDAP functions comprise QoS marking and flow control.

PDCP functions comprise security ciphering, header compression and decompression, sequence numbering and re-sequencing, de-duplication. RLC functions comprise Automatic Repeat Request (ARQ), sequence numbering and resequencing, segmentation and resegmentation. MAC functions comprise buffer status, power control, channel quality, Hybrid Automatic Repeat Request (HARM), user identification, random access, user scheduling, and QoS. PHY functions comprise packet formation/deformation, windowing/de-windowing, guard-insertion/guard-deletion, parsing/de-parsing, control insertion/removal, interleaving/de-interleaving, Forward Error Correction (FEC) encoding/decoding, rate matching/de-matching, scrambling/descrambling, modulation mapping/de-mapping, channel estimation/equalization, Fast Fourier Transforms (FFTs)/ Inverse FFTs (IFFTs), channel coding/decoding, layer mapping/de-mapping, precoding, Discrete Fourier Transforms (DFTs)/Inverse DFTs (IDFTs), and Resource Element (RE) mapping/de-mapping.

Figure 5:
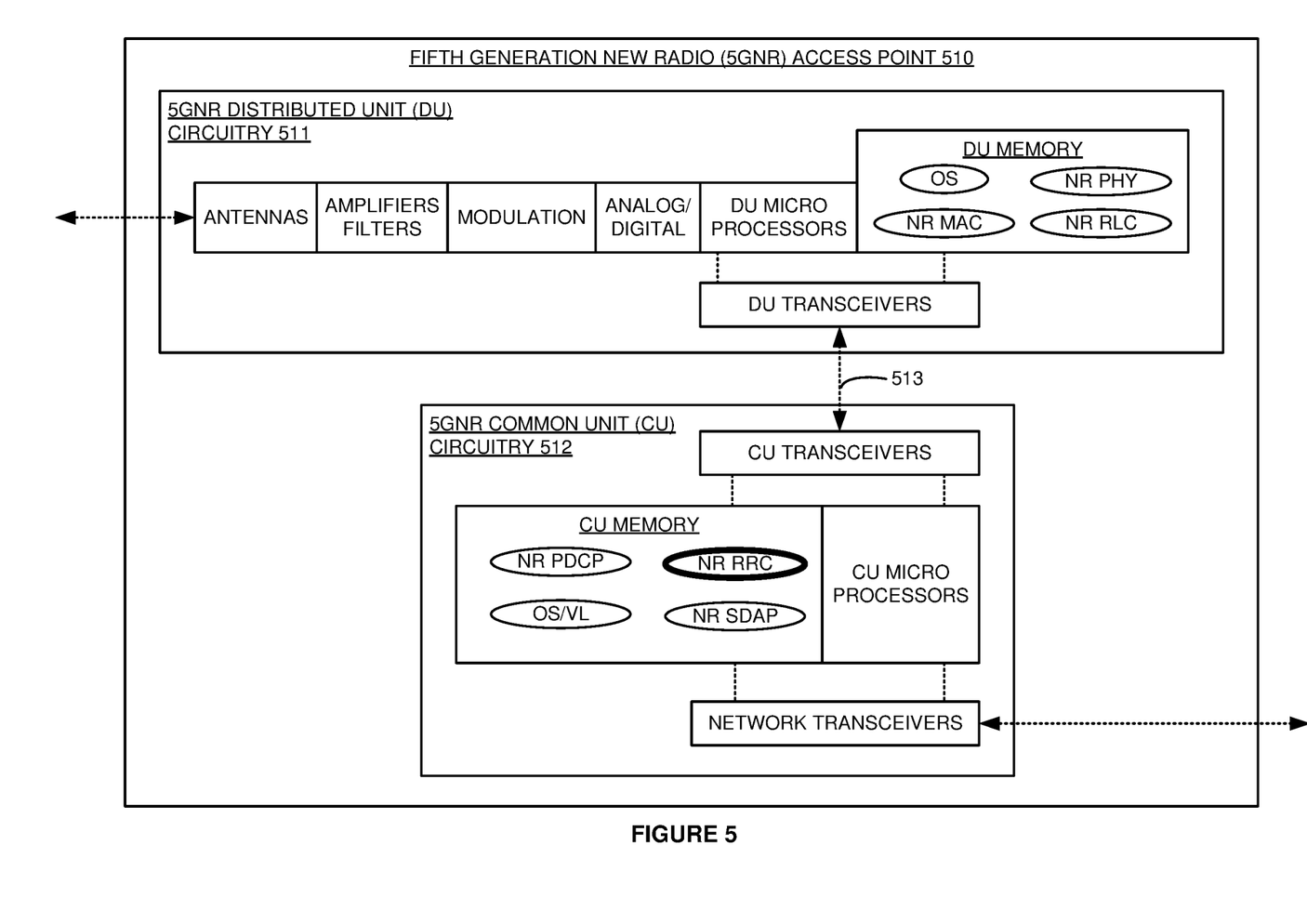
FIG. 5 illustrates a 5GNR access point that broadcasts the 5GNR SIB1 that indicates the PCI, multiple PLMN IDs, and individual PLMN information for each of the PLMN IDs to assist the 5GNR UE with PLMN selection.

FIG. 5 illustrates 5GNR access point 510 that broadcasts a 5GNR SIB that characterizes multiple PLMN IDs to assist 5GNR UEs with PLMN selection. 5GNR access point 510 comprises an example of wireless access point 110, although access point 110 may differ. 5GNR access point 510 comprises 5GNR Distributed Unit (DU) circuitry 511, 5GNR Centralized Unit (CU) circuitry 511, and DU/CU link 513. DU circuitry 511 comprises antennas, duplexers, amplifiers, filters, modulation, analog/digital interfaces, DU microprocessors, DU memory, and DU transceivers that are coupled over bus circuitry and/or some other data links. CU circuitry 513 comprises CU microprocessors, CU memory, and transceivers that are coupled over bus circuitry and/or some other data links. The antennas in 5GNR DU circuitry 511 are coupled to 5GNR UEs over wireless NR links. The network transceivers in 5GNR CU circuitry are coupled to network elements over 5G data links like N2 and N3.

The DU/CU microprocessors comprise DSPs, CPUs, GPUs, and/or some other computer circuitry. The DU/CU memories comprise volatile and non-volatile memories like RAM, flash, and/or the like. The DU/CU memories stores operating systems and network applications like PHY, MAC, RLC, PDCP, RRC, and SDAP. The CU memory also stores virtual layer (VL) components like hypervisor modules, virtual switches, virtual machines, and/or the like. In this example, DU circuitry 511 hosts the network applications for NR PHY, NR MAC, and NR RLC while CU circuitry 512 hosts the network applications for NR PDCP, NR RRC, and NR SDAP. In other examples, DU circuitry 511 and CU circuitry 512 may use other network application splits. Thus, 5GNR DU circuitry 511 hosts a 5GNR radio transceiver and a portion of a 5GNR baseband unit. 5GNR CU circuitry 512 hosts the remainder of the 5GNR baseband unit.

The DU and CU microprocessors execute the operating system and network applications to wirelessly exchange user data and network signaling with 5GNR UEs. The transmitted network signaling includes broadcast SIBs that characterize the PLMNs. The received network signaling indicates PLMN selections from the 5GNR UEs. The DU and CU microprocessors execute the operating system and network applications to exchange corresponding user data and network signaling with network elements like 5G AMF, SMF, and UPF. The transmitted network signaling indicates the PLMN selections from the 5GNR UEs.

In 5GNR DU circuitry 511, the antennas receive wireless Uplink (UL) signals from 55GNR UEs that transport user data and network signaling. The UL network signaling includes UE PLMN selections. The antennas transfer corresponding electrical UL signals through the duplexers to the amplifiers. The amplifiers boost the received UL signals for filters which attenuate unwanted energy. In modulation, demodulators down-convert the UL signals from their carrier frequencies. The analog/digital interfaces convert the analog UL signals into digital UL signals for the DU microprocessors. The DU microprocessors execute the NR PHY, NR MAC, and NR RLC to recover UL PDUs from the UL signals. The DU microprocessors transfer the UL PDUs from the DU memory to the CU memory in CU circuitry 512 over DU/CU link 513. In NR CU circuitry 512, the CU microprocessors execute the NR PDCP, NR RRC, and NR SDAP to recover UL user data and network signaling from the UL PDUs. The CU microprocessors execute the NR RRC, NR SDAP, and LTE RRC to transfer the UL user data and corresponding network signaling from the CU memory to the network elements. The UL network signaling includes the UE PLMN selections.

In 5GNR CU circuitry 512, the CU microprocessors receive Downlink (DL) user data and network signaling from the network elements and store the DL user data and network signaling in the CU memory. The DL network signaling includes provisioning information for the NR RRC that indicates a PCI, PLMN IDs for the PCI, and individual PLMN for the PLMNs like Cell Selection Information, Cell Access Related Information, User Access Class Barring Information, and Neighbor Cell Configuration Information. The CU microprocessors execute the NR SDAP, NR RRC, and NR PDCP to process the DL user data and network signaling and responsively transfer DL PDUs to the DU memory in DU circuitry 511 over link 513.

In NR DU circuitry 512, the DU microprocessors execute the NR RLC, NR MAC, and NR PHY to process the DL PDUs and generate corresponding digital DL signals for the analog/digital interface. In DU circuitry 511, the analog/digital interfaces convert the digital DL signals into analog DL signals for modulation. Modulation up-converts the DL signals to their carrier frequencies. The amplifiers boost the modulated DL signals for the filters which attenuate unwanted out-of-band energy. The filters transfer the DL signals through the duplexers to the antennas. The electrical DL signals drive the antennas to emit corresponding wireless DL signals that transport the DL user data and network signaling to the UEs. The wireless DL signals have SIB1 broadcasts that characterize the individual PLMNs.

The NR RRC exchanges network signaling with network elements over N2 links. The network signaling includes provisioning information that characterizes PLMNs and UE PLMN selections. The NR RRC maps between the network signaling and SDUs. The NR SDAP exchanges user data with the network elements over N3 links. The NR SDAP maps between the user data SDUs. The NR RRC and SDAP exchange their SDUs with the NR PDCP. The NR PDCP maps between the SDUs and PDUs. The NR PDCP exchanges the PDUs with the NR RLC over link 513. The NR RLC maps between the PDUs and MAC logical channels. The NR RLC exchanges user data and network signaling with the NR MAC over the MAC logical channels. The NR MAC maps between the MAC logical channels and MAC transport channels. The NR MAC exchanges user data and network signaling with the NR PHY over the MAC transport channels. The NR PHY maps between the MAC transport channels and PHY transport channels. The NR PHY exchanges user data and network signaling with NR PHYs in 5GNR UEs over the PHY transport channels. The network signaling includes the SIB1 broadcasts that characterize the PLMNs and the UE PLMN selections.

The NR RRC receives the provisioning information that indicates the PLMNs and individual characterization data for each of the PLMNs. The NR RRC generates a 5GNR SIB1 to broadcast the PLMNs and their individual characterization data to the UEs. The NR RRC also receives network signaling from the UEs that indicates their selected PLMNs. The NR RRC transfers network signaling to the network elements that indicate the selected PLMNs. Additional NR RRC functions comprise authentication, security, handover control, status reporting, QoS, and network pages.

SDAP functions comprise QoS marking and flow control. PDCP functions comprise security ciphering, header compression and decompression, sequence numbering and resequencing, de-duplication. RLC functions comprise ARQ, sequence numbering and resequencing, segmentation and resegmentation. MAC functions comprise buffer status, power control, channel quality, HARQ, user identification, random access, user scheduling, and QoS. PHY functions comprise packet formation/deformation, windowing/de-windowing, guard-insertion/guard-deletion, parsing/de-parsing, control insertion/removal, interleaving/de-interleaving, FEC encoding/decoding, rate matching/de-matching, scrambling/descrambling, modulation mapping/de-mapping, channel estimation/equalization, FFTs/IFFTs, channel coding/decoding, layer mapping/de-mapping, pre-coding, DFTs/IDFTs, and RE mapping/de-mapping.

Figure 6:
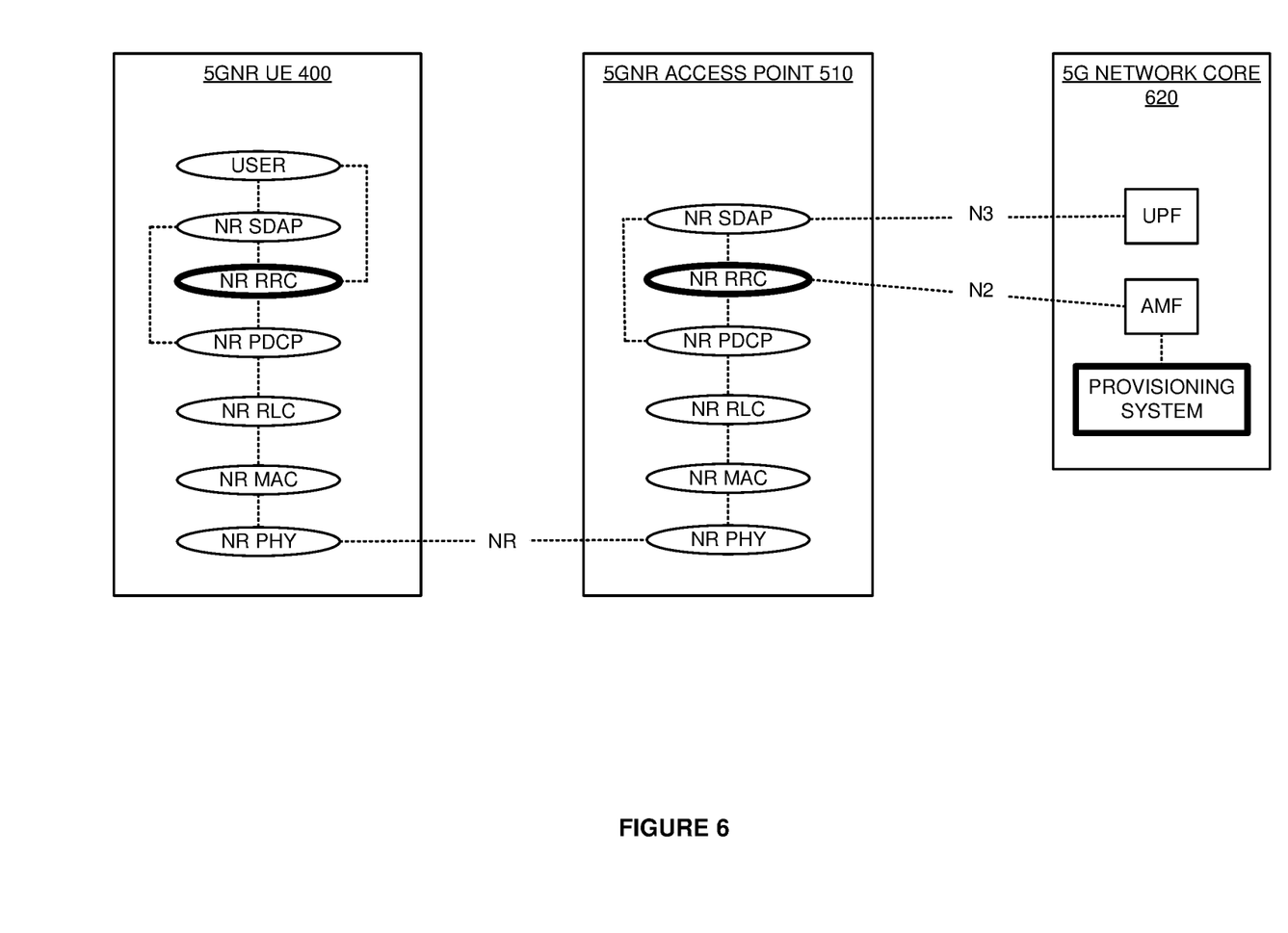
FIG. 6 illustrates the operation of the 5GNR access point to broadcast the 5GNR SIB1 that indicates the PCI, multiple PLMN IDs, and individual PLMN information for each of the PLMN IDs to assist the 5GNR UE with PLMN selection.

FIG. 6 illustrates the operation of 5GNR access point 510 to broadcast a 5GNR SIB1 that characterizes PLMNs to assist 5GNR UE 400 with PLMN selection. In 5G network core 620, a provisioning system transfers PLMN information for 5GNR access point 510 to the AMF. The AMF transfers the PLMN information to the NR RRC in 5GNR access point 510 over the N2. The PLMN information indicates PLMN IDs and individual Cell Selection Information, Cell Access Related Information, User Access Class Barring Information, and Neighbor Cell Configuration Information for each of the PLMN IDs. The Cell Selection Information indicates the minimum received signal power for each of the PLMN IDs. The Cell Access Related Information indicates the Tracking Area Codes (TACs) and cell status for each of the PLMN IDs. The User Access Class Barring Information indicates barring information like access probability and barring time for each of the PLMN IDs. The Neighbor Cell Configuration Information indicates whether the Multicast-Broadcast Single Frequency Network (MBSFN) subframe configuration for neighboring cells is the same or different from PCI X for each of the PLMN IDs. The Neighbor Cell Configuration Information also indicates whether the UL/DL configurations for neighboring cells is the same or different from PCI X for each of the PLMN IDs.

In 5GNR access point 510, the NR RRC generates SIB1 data that contains the Physical Cell Identifier (PCI) for access point 510 and the PLMNs ID. For each of the PLMN IDs, the SIB1 also specifies the Cell Selection Information, Cell Access Related Information, User Access Class Barring Information, and Neighbor Cell Configuration Information. The NR RRC in 5GNR access point 510 transfers the SIB1 to the NR RRC in 5GNR UE 400 over their respective NR PDCPs, RLCs, MACs, and PHYs.

In 5GNR UE 400, the NR RRC selects one of the PLMNs in the SIB1 broadcast block based on the Cell Selection Information, Cell Access Related Information, User Access Class Barring Information, and/or Neighbor Cell Configuration Information in the SIB1. For example, the NR RRC may store a prioritized list of data fields/values to match against the parsed Cell Access Related Information for each the PLMN IDs. The NR RRC selects the PLMN ID that has the most high-priority field/value matches. The NR RRC in 5GNR UE 400 transfers 5GNR attachment signaling indicating the selected PLMN to the NR RRC in 5GNR access point 510 over their respective NR PDCPs, RLCs, MACs, and PHYs.

The NR RRC in 5GNR access point 510 transfers 5GNR attachment signaling indicating the selected PLMN ID to the AMF in 5G network core 620 over the N2. After the exchange of additional set-up signaling, the UPF in 5G network core 620 exchanges user data with the NR SDAP in 5GNR access point 510 over the N3. The NR SDAP in 5GNR access point 510 exchanges the user data with the NR SDAP in 5GNR UE 400 over their respective NR PDCPs, RLCs, MACs, and PHYs. The NR SDAP in 5GNR UE 400 exchanges the user data with the user applications.

Figure 7:
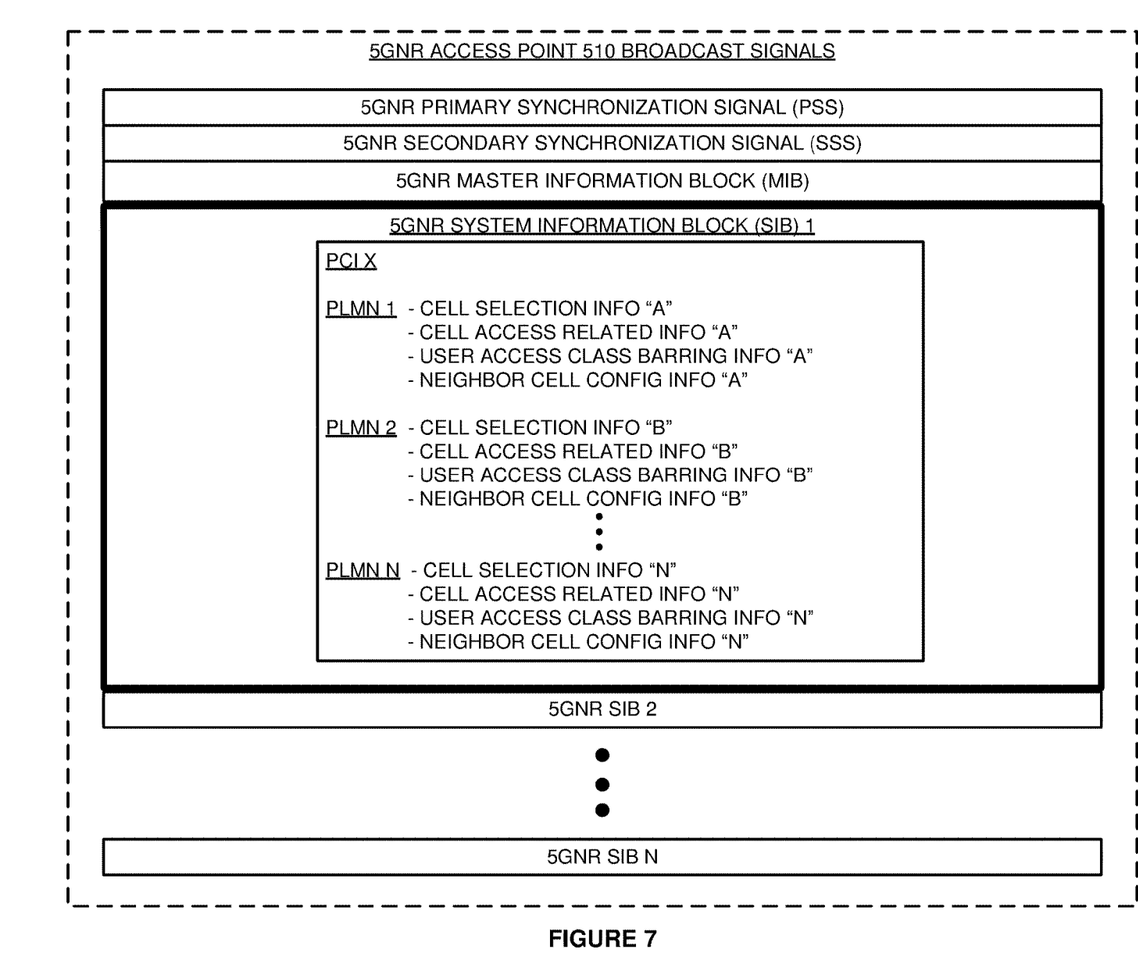
FIG. 7 illustrates the 5GNR SIB1 that indicates the PCI, multiple PLMN IDs, and individual PLMN information for each of the PLMN IDs to assist the 5GNR UE with PLMN selection.

FIG. 7 illustrates a 5GNR SIB1 that indicates multiple PLMN IDs and individual PLMN information for each of the PLMN IDs to assist 5GNR UEs with PLMN selection. The 5GNR SIB1 is carried in a set of wireless signals that are broadcast from 5GNR access point 510. These broadcast signals also include a 5GNR Primary Synchronization Signal (PSS), Secondary Synchronization Signal (SSS), Master Information Block (MIB), and additional SIBs 2-N. The PSS is offset from the frequency channel center and indicates SSS synchronization and decoding information. The SSS has 5GNR frame synchronization data and Cell Global Identity (CGI) information. The MIB indicates channel bandwidth, channel power, channel random access information, number of antennas, and a signaling schedule.

On FIG. 7, the terms "A", "B", and "N" are merely representative and are used for clarity—actual network values/text would be used in practice. The SIB1 indicates PCI X for 5GNR access point 510. The SIB1 indicates PLMNs 1-N for PCI X. For PLMN 1, the SIB1 indicates Cell Selection Information "A", Cell Access Related Information "A", User Access Class Barring Information "A", and/or Neighbor Cell Configuration Information "A". For PLMN "B", the SIB1 indicates Cell Selection Information "B", Cell Access Related Information "B", User Access Class Barring Information "B", and/or Neighbor Cell Configuration Information "B". For PLMN "N", the SIB1 indicates Cell Selection Information "N", Cell Access Related Information "N", User Access Class Barring Information "N", and/or Neighbor Cell Configuration Information "N".

The Cell Selection Information indicates an individual minimum received signal power for each of the PLMN IDs. The Cell Access Related Information indicates a Tracking Area Code (TAC) and cell status for each of the PLMN IDs. The User Access Class Barring Information indicates individual barring information like access probability and barring time for each of the PLMN IDs. The Neighbor Cell Configuration Information indicates whether an MBSFN subframe configuration for neighboring cells is the same or different from PCI X for each of the PLMN IDs. The Neighbor Cell Configuration Information also indicates whether the UL/DL configurations for neighboring cells is the same or different from PCI X for each of the PLMN IDs. For clarity, some 5GNR SIB1 data is omitted. In addition, the 5GNR SIB1 may list more PCIs along with their PLMNs and PLMN information in the same manner as PCI X.

The wireless data network circuitry described above comprises computer hardware and software that form special-purpose wireless access point circuitry to assist wireless user devices with wireless communication network selection. The computer hardware comprises processing circuitry like CPUs, DSPs, GPUs, transceivers, bus circuitry, and memory. To form these computer hardware structures, semiconductors like silicon or germanium are positively and negatively doped to form transistors. The doping comprises ions like boron or phosphorus that are embedded within the semiconductor material. The transistors and other electronic structures like capacitors and resistors are arranged and metallically connected within the semiconductor to form devices like logic circuitry and storage registers. The logic circuitry and storage registers are arranged to form larger structures like control units, logic units, and Random-Access Memory (RAM). In turn, the control units, logic units, and RAM are metallically connected to form CPUs, DSPs, GPUs, transceivers, bus circuitry, and memory.

In the computer hardware, the control units drive data between the RAM and the logic units, and the logic units operate on the data. The control units also drive interactions with external memory like flash drives, disk drives, and the like. The computer hardware executes machine-level software to control and move data by driving machine-level inputs like voltages and currents to the control units, logic units, and RAM. The machine-level software is typically compiled from higher-level software programs. The higher-level software programs comprise operating systems, utilities, user applications, and the like. Both the higher-level software programs and their compiled machine-level software are stored in memory and retrieved for compilation and execution. On power-up, the computer hardware automatically executes physically-embedded machine-level software that drives the compilation and execution of the other computer software components which then assert control. Due to this automated execution, the presence of the higher-level software in memory physically changes the structure of the computer hardware machines into special-purpose wireless access point circuitry to assist wireless user devices with wireless communication network selection.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. Thus, the invention is not limited to the specific embodiments described above, but only by the following claims and their equivalents.

What is claimed is:

1. A method of operating a wireless access point to assist wireless user devices when selecting wireless communication networks, the method comprising:
   a baseband unit receiving network information transferred by a provisioning system that indicates the wireless communication networks and network selection information that individually characterizes each of the wireless communication networks;
   the baseband unit generating a broadcast block that comprises a cell identifier for the wireless access point, the wireless communication network identifiers, and the network selection information that individually characterizes the wireless communication networks;
   a radio transceiver wirelessly broadcasting the broadcast block, and in response, wirelessly receiving user signaling from the wireless user devices that indicate selected ones of the wireless communication networks, wherein the wireless user devices select the wireless communication networks based on the network selection information in the broadcast block; and
   the baseband unit transferring network signaling for delivery to a network element that indicates the selected ones of the wireless communication networks for the wireless user devices.

2. The method of claim 1 wherein the broadcast block comprises a single System Information Block (SIB) 1.

3. The method of claim 1 wherein the broadcast block comprises a single Fifth Generation New Radio (5GNR) System Information Block (SIB).

4. The method of claim 1 wherein the wireless communication network identifiers comprise Public Land Mobile Network Identifiers (PLMN IDs).

5. The method of claim 1 wherein the wireless network cell identifier comprises a Physical Cell Identifier (PCI).

6. The method of claim 1 wherein:
   the broadcast block comprises a Fifth Generation New Radio (5GNR) System Information Block (SIB) 1;
   the wireless communication network identifiers comprise Public Land Mobile Network Identifiers (PLMN IDs); and
   the wireless network cell identifier comprises a Physical Cell Identifier (PCI).

7. The method of claim 1 wherein the network selection information comprises individual Cell Selection Information for each of the wireless communication networks.

8. The method of claim 1 wherein the network selection information comprises individual Cell Access Related Information for each of the wireless communication networks.

9. The method of claim 1 wherein the network selection information comprises individual User Access Class Barring Information for each of the wireless communication networks.

10. The method of claim 1 wherein the network selection information comprises individual Neighbor Cell Configuration Information for each of the wireless communication networks.

11. A wireless access point to assist wireless user devices when selecting wireless communication networks, the method comprising:
    a baseband unit configured to receive network information transferred by a provisioning system that indicates the wireless communication networks and network selection information that individually characterizes each of the wireless communication networks;
    the baseband unit configured to generate a broadcast block that comprises a cell identifier for the wireless access point, the wireless communication network identifiers, and the network selection information that individually characterizes the wireless communication networks;
    a radio transceiver configured to wirelessly broadcast the broadcast block, and in response, wirelessly receive user signaling from the wireless user devices that indicate selected ones of the wireless communication networks, wherein the wireless user devices select the wireless communication networks based on the network selection information in the broadcast block; and
    the baseband unit configured to transfer network signaling for delivery to a network element that indicates the selected ones of the wireless communication networks for the wireless user devices.

12. The wireless access point of claim 11 wherein the broadcast block comprises a single System Information Block (SIB) 1.

13. The wireless access point of claim 11 wherein the broadcast block comprises a single Fifth Generation New Radio (5GNR) System Information Block (SIB).

14. The wireless access point of claim 11 wherein the wireless communication network identifiers comprise Public Land Mobile Network Identifiers (PLMN IDs).

15. The wireless access point of claim 11 wherein the wireless network cell identifier comprises a Physical Cell Identifier (PCI).

16. The wireless access point of claim 11 wherein:
    the broadcast block comprises a Fifth Generation New Radio (5GNR) System Information Block (SIB) 1;
    the wireless communication network identifiers comprise Public Land Mobile Network Identifiers (PLMN IDs); and
    the wireless network cell identifier comprises a Physical Cell Identifier (PCI).

17. The wireless access point of claim 11 wherein the network selection information comprises individual Cell Selection Information for each of the wireless communication networks.

18. The wireless access point of claim 11 wherein the network selection information comprises individual Cell Access Related Information for each of the wireless communication networks.

19. The wireless access point of claim 11 wherein the network selection information comprises individual User Access Class Barring Information for each of the wireless communication networks.

20. The wireless access point of claim 11 wherein the network selection information comprises individual Neighbor Cell Configuration Information for each of the wireless communication networks.

* * * * *